United States Patent
Tsuyuki

(10) Patent No.: US 11,879,369 B2
(45) Date of Patent: Jan. 23, 2024

(54) VEHICLE CONTROL METHOD AND VEHICLE CONTROL DEVICE

(71) Applicant: NISSAN MOTOR CO., LTD., Yokohama (JP)

(72) Inventor: Takeshi Tsuyuki, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/630,668

(22) PCT Filed: Apr. 8, 2020

(86) PCT No.: PCT/JP2020/015799
§ 371 (c)(1),
(2) Date: Jan. 27, 2022

(87) PCT Pub. No.: WO2021/205561
PCT Pub. Date: Oct. 14, 2021

(65) Prior Publication Data
US 2022/0268187 A1    Aug. 25, 2022

(51) Int. Cl.
| F01N 3/00 | (2006.01) |
| F01N 3/023 | (2006.01) |
| B60W 50/12 | (2012.01) |
| F02D 43/00 | (2006.01) |

(52) U.S. Cl.
CPC ............ *F01N 3/023* (2013.01); *B60W 50/12* (2013.01); *F02D 43/00* (2013.01); *B60W 2510/068* (2013.01); *B60W 2510/0638* (2013.01)

(58) Field of Classification Search
CPC .. F01N 3/023; F01N 2900/1606; F01N 9/002; B60W 50/12; B60W 2510/0638; B60W 2510/068; F02D 41/0005; F02D 41/029; F02D 41/123; F02D 2200/101
See application file for complete search history.

(56) References Cited

U.S. PATENT DOCUMENTS

| 8,181,452 B2* | 5/2012 | Bidner | F01N 3/023 60/296 |
| 10,107,169 B2* | 10/2018 | Hatta | F01N 3/025 |
| 2011/0072788 A1* | 3/2011 | Ruona | F02M 26/05 60/287 |

(Continued)

FOREIGN PATENT DOCUMENTS

| CN | 110945219 A | 3/2020 |
| DE | 10 2017 100 892 A1 | 7/2018 |
| JP | 2020-12404 A | 1/2020 |

*Primary Examiner* — Matthew T Largi
(74) *Attorney, Agent, or Firm* — Foley & Lardner LLP

(57) ABSTRACT

Set a lower limit for an engine revolution speed when an accelerator is off while a temperature of the gasoline particulate filter is equal to or lower than a predetermined first temperature or equal to or higher than a predetermined second temperature, the predetermined second temperature being higher than the predetermined first temperature, and continue the lower limit setting for the engine revolution speed until the accelerator becomes on when the temperature of the gasoline particulate filter increases over the predetermined first temperature from the predetermined first temperature or lower or decreases below the predetermined second temperature from the predetermined second temperature or higher after the lower limit for the engine revolution speed is set.

5 Claims, 7 Drawing Sheets

(56) References Cited

U.S. PATENT DOCUMENTS

| | | | |
|---|---|---|---|
| 2016/0339905 A1* | 11/2016 | Inoue | B60W 10/08 |
| 2017/0051652 A1* | 2/2017 | De Smet | F01N 3/035 |
| 2018/0244274 A1* | 8/2018 | Katayama | F02D 41/025 |
| 2020/0025118 A1 | 1/2020 | Kurita et al. | |

* cited by examiner

VEHICLE CONTROL METHOD AND VEHICLE CONTROL DEVICE

TECHNICAL FIELD

The present invention relates to a vehicle control method and a vehicle control device.

BACKGROUND ART

JP2020-12404A discloses a vehicle provided with a gasoline particulate filter (GPF) in which a fuel cut is prohibited when a temperature of the GPF is higher than a predetermined temperature.

SUMMARY OF INVENTION

In the vehicle provided with the GPF, for example, for the purpose of suppressing generation of a rattling noise from a drive system by prohibiting the fuel cut as described above, raising the GPF temperature to promote a regeneration process of the GPF, and the like, it is conceivable to set a lower limit for an engine revolution speed on the basis of the GPF temperature.

However, when the lower limit is set for the engine revolution speed, and the lower limit setting is canceled depending on a temperature change of the GPF, the engine revolution speed may abruptly change and affect operability of the vehicle.

In view of such technical problems, it is therefore an object of the present invention to reduce influence on the operability of the vehicle caused by cancellation of the lower limit setting while the lower limit for the engine revolution speed is set on the basis of the GPF temperature.

According to one aspect of the present invention, a vehicle control method for a vehicle provided with a gasoline particulate filter that collects particulate matter contained in an exhaust gas from an engine is provided. The vehicle control method includes: setting a lower limit for an engine revolution speed when an accelerator is off while a temperature of the gasoline particulate filter is equal to or lower than a predetermined first temperature or equal to or higher than a predetermined second temperature, the predetermined second temperature being higher than the predetermined first temperature; and continuing the lower limit setting for the engine revolution speed until the accelerator becomes on when the temperature of the gasoline particulate filter increases over the predetermined first temperature from the predetermined first temperature or lower or decreases below the predetermined second temperature from the predetermined second temperature or higher after the lower limit for the engine revolution speed is set.

DESCRIPTION OF EMBODIMENTS

Embodiments of the present invention will now be described with reference to the accompanying drawings.

Figure 1:
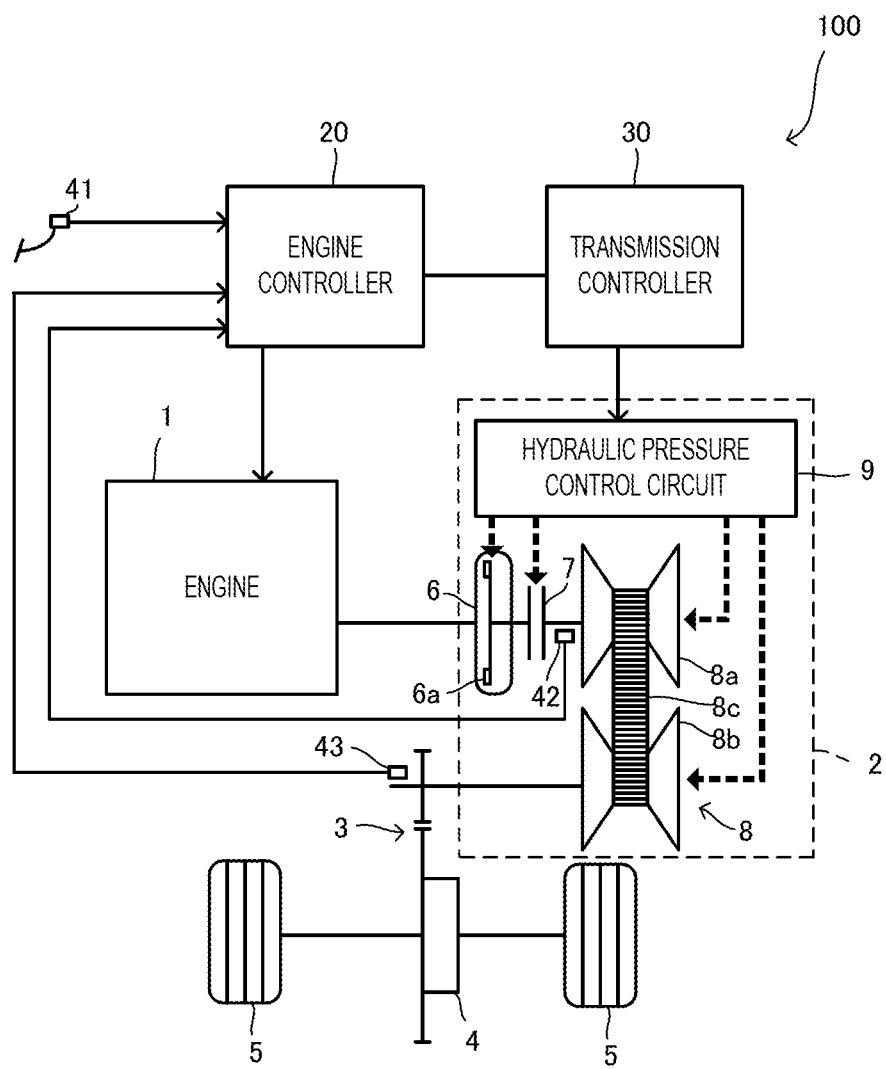
FIG. 1 is a schematic configuration diagram illustrating a main configuration of a vehicle according to an embodiment of the present invention.

FIG. 1 is a schematic configuration diagram illustrating a main configuration of a vehicle 100 according to an embodiment of the present invention.

As shown in FIG. 1, the vehicle 100 has an engine 1, an automatic transmission 2, a reduction gear train 3, a differential unit 4, drive wheels 5, an engine controller (control device) 20 that controls the engine 1, and a transmission controller 30 that controls the automatic transmission 2.

The engine 1 is an internal combustion engine that uses gasoline as fuel.

The automatic transmission 2 has a torque converter 6, a forward clutch 7, a variator 8, and a hydraulic pressure control circuit 9.

The torque converter 6 has a lockup clutch 6a. The torque converter 6 amplifies and outputs the torque input from the engine 1 by virtue of a torque amplification action in a disengaged state of the lockup clutch 6a, and transmits rotation of the engine 1 without a loss in an engaged state of the lockup clutch 6a.

The forward clutch 7 is a hydraulic multi-plate clutch that connects or disconnects a power transmission path between the engine 1 and the drive wheels 5, and is engaged when the vehicle 100 moves forward. The forward clutch 7 can adjust a torque capacity (the maximum value of the torque that can be transmitted) by adjusting the hydraulic pressure supplied from the hydraulic pressure control circuit 9. Note that, although only the forward clutch 7 is illustrated in FIG. 1, the automatic transmission 2 also has a backward brake that is engaged when the vehicle moves backward. When the backward brake is engaged, the rotation of the engine 1 is reversed and input to the variator 8.

The variator 8 is a continuously variable transmission mechanism including a primary pulley 8a, a secondary pulley 8b, and a belt 8c hung therebetween. The variator 8 can change groove widths of each of the pulleys 8a and 8b by adjusting the hydraulic pressure supplied from the hydraulic pressure control circuit 9. This makes it possible to change a speed ratio (input rotation speed/output rotation speed) in a stepless manner.

The rotation of the engine 1 is changed by the variator 8, and is transmitted to the left and right drive wheels 5 via the reduction gear train 3 and the differential unit 4.

The hydraulic pressure control circuit 9 uses the hydraulic pressure of the hydraulic oil supplied from an oil pump (not shown) as a main pressure to regulate the hydraulic pressures supplied to the lockup clutch 6a, the forward clutch 7, the backward brake, the primary pulley 8a, the secondary pulley 8b, and the like and supply the regulated hydraulic pressure to each part. As a result, the engagement state of the lockup clutch 6a, the engagement state of the forward clutch 7, the engagement state of the backward brake, and the speed ratio of the variator 8 are changed.

The engine controller 20 includes a microcomputer provided with a CPU, a RAM, a ROM, an input/output interface, and the like. The engine controller 20 performs various processes by reading and executing the program stored in the ROM by the CPU. The engine controller 20 may also include a plurality of microcomputers.

The engine controller 20 receives signals input from an accelerator position sensor 41 that detects an accelerator position APO, a rotation speed sensor 42 that detects a rotation speed Npri (=engine revolution speed) of the primary pulley 8a, a vehicle speed sensor 43 that detects a vehicle speed Vsp, and the like. The engine controller 20 controls an ignition timing of a spark plug, a fuel injection amount from an injector, and the like on the basis of the input signals. The engine controller 20 will be described in more details below.

The transmission controller 30 includes a microcomputer provided with a CPU, a RAM, a ROM, an input/output interface, and the like, and is communicatably connected to the engine controller 20. The transmission controller 30 performs various processes by reading and executing the program stored in the ROM by the CPU. The transmission controller 30 may also include a plurality of microcomputers.

The transmission controller 30 controls the engagement state of the lockup clutch 6a, the engagement state of the forward clutch 7, the engagement state of the backward brake, and the speed ratio of the variator 8 via the hydraulic pressure control circuit 9.

Figure 2:
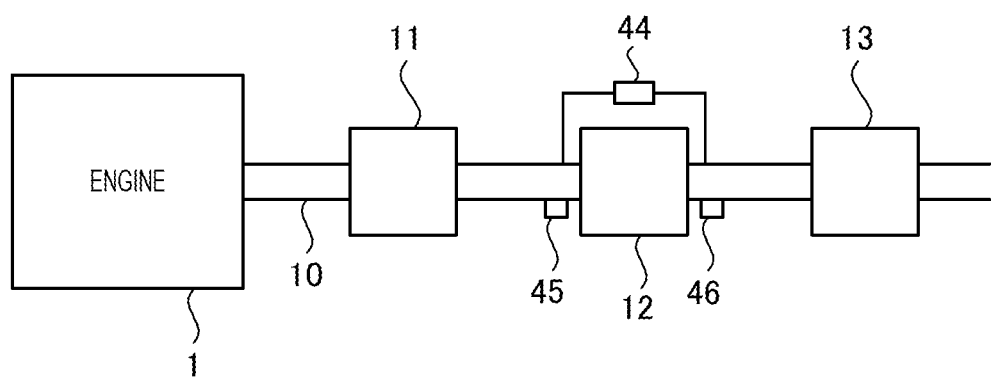
FIG. 2 is a schematic configuration diagram illustrating a main configuration of an engine exhaust system.

Next, an exhaust system of the engine 1 will be described with reference to FIG. 2. FIG. 2 is a schematic configuration diagram illustrating a main configuration of the exhaust system of the engine 1.

As shown in FIG. 2, an exhaust passage 10 is connected to the engine 1. The exhaust passage 10 includes a catalyst converter 11, a gasoline particulate filter (GPF) 12, a muffler 13, a differential pressure sensor 44 that detects a differential pressure Pd between the upstream side and the downstream side of the GPF 12, a temperature sensor 45 that detects an exhaust temperature Ti at the inlet of the GPF 12, and a temperature sensor 46 that detects an exhaust temperature To at the outlet of the GPF 12.

The catalyst converter 11 internally has an exhaust gas purification catalyst such as a three-way catalyst and is arranged on the upstream side of the GPF 12. The catalytic converter 11 purifies the exhaust gas by oxidizing unburned components such as HC and CO contained in the exhaust gas of the engine 1 or reducing oxidizing components such as NOx. The catalyst converter may also be arranged in the downstream side of the GPF 12.

The GPF 12 is a filter that collects particulate matter (PM) in the exhaust gas of the engine 1.

The muffler 13 is provided in the downstream side of the GPF 12 to reduce the exhaust noise of the passing exhaust gas.

In the configuration described above, the exhaust gas from the engine 1 flows through the exhaust passage 10, and is purified by the catalyst converter 11. In addition, the PM is removed by the GPF 12, and the exhaust gas is then discharged to the outside from the muffler 13.

Meanwhile, since the GPF 12 may be clogged as the PM is accumulated, it is necessary to burn the PM accumulated in the GPF 12 at an appropriate timing to regenerate the GPF 12.

The regeneration process of the GPF 12 will now be described with reference to FIGS. 3 and 4.

Figure 3:
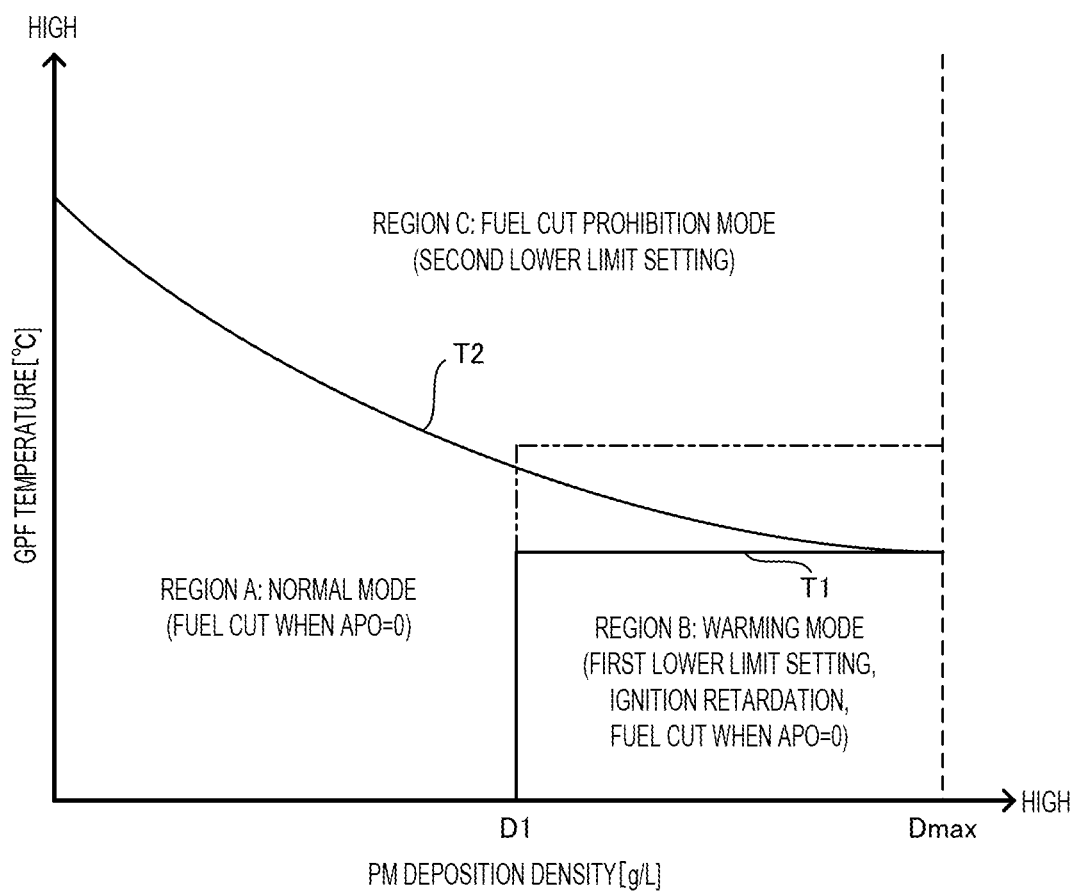
FIG. 3 is a diagram illustrating a relationship between a GPF state and an engine operation mode.

FIG. 3 is a diagram illustrating a relationship between the state of GPF 12 and the operation mode of the engine 1. FIG. 4 is a shift map of the automatic transmission 2.

In the region A of FIG. 3, the operation mode of the engine 1 is the normal mode.

In the normal mode, when the accelerator is off (APO=0), the fuel cut of the engine 1 is executed. As a result, the air is sent to the GPF 12, so that when the floor temperature of the GPF 12 (hereinafter, referred to as "GPF temperature") rises over the PM combustion temperature at which the PM begins to burn, the combustion of the PM is promoted by the heat of the GPF 12 and the supplied oxygen.

The region B of FIG. 3 is a region where the density of the PM deposited on the GPF 12 (hereinafter, referred to as "PM deposition density") is equal to or higher than a predetermined density D1, and the GPF temperature is equal to or lower than a predetermined first temperature T1. In the region B, the operation mode of the engine 1 is set to a warming mode in which ignition retardation of the engine 1 is executed, and the lower limit (first lower limit) is set for the engine revolution speed to increase the GPF temperature. In the warming mode, the fuel cut of the engine 1 is executed when the accelerator is off.

When the first lower limit is set as a lower limit of the engine revolution speed, the shift control of the variator 8 is performed such that the target rotation speed TNpri of the primary pulley 8a does not fall below the first lower limit line of FIG. 4.

If the PM deposition density is equal to or higher than the density D1, it is necessary to burn the PM deposited before the PM deposition density reaches the upper limit Dmax to prevent clogging of the GPF 12. For this reason, in the warming mode, the exhaust temperature of the engine 1 increases, and the GPF temperature actively increases up to the PM combustion temperature or higher by executing ignition retardation and setting the lower limit (first lower limit) for the engine revolution speed to increase a workload of the engine 1. The specific density D1 is set depending on the specification of the vehicle. Note that it is also possible to increase the GPF temperature by setting only one of the ignition retardation and the lower limit setting of the engine revolution speed.

The region C in FIG. 3 is a region where the GPF temperature is equal to or higher than a predetermined second temperature T2. In the region C, the operation mode of the engine 1 is a fuel cut prohibition mode in which the fuel cut of the engine 1 is not executed even when the accelerator is off. In the fuel cut prohibition mode, a lower limit (second lower limit) is set for the engine revolution speed.

When the second lower limit is set as a lower limit of the engine revolution speed, the shift control of the variator 8 is performed such that the target rotation speed TNpri of the primary pulley 8a does not fall below the second lower limit line of FIG. 4.

When the GPF temperature is equal to or higher than the second temperature T2, and the fuel cut is executed, the GPF temperature increases due to the combustion of the PM, which may cause thermal deterioration of the GPF 12. In comparison, in the fuel cut prohibition mode, even when the accelerator is off, the fuel cut of the engine 1 is not executed, so that the combustion of the PM is suppressed.

As the PM deposition density increases, the second temperature T2 decreases. This is because the higher PM deposition density further promotes combustion of the PM, which increases the GPF temperature. Alternatively, the second temperature T2 may be constant regardless of the PM deposition density.

When the fuel cut is prohibited in the accelerator off state, and the engine revolution speed is in a specific low rotation speed region, a rattling noise may occur from the drive system. Therefore, in the fuel cut prohibition mode, the second lower limit is set such that the engine revolution speed becomes higher than the specific low rotation speed region. As a result, it is possible to suppress the rattling noise from the drive system. In addition, by limiting the lower limit of the engine revolution speed even in the accelerator on state, it is possible to smoothly advance to the fuel cut prohibition state when the accelerator becomes off.

Figure 5:
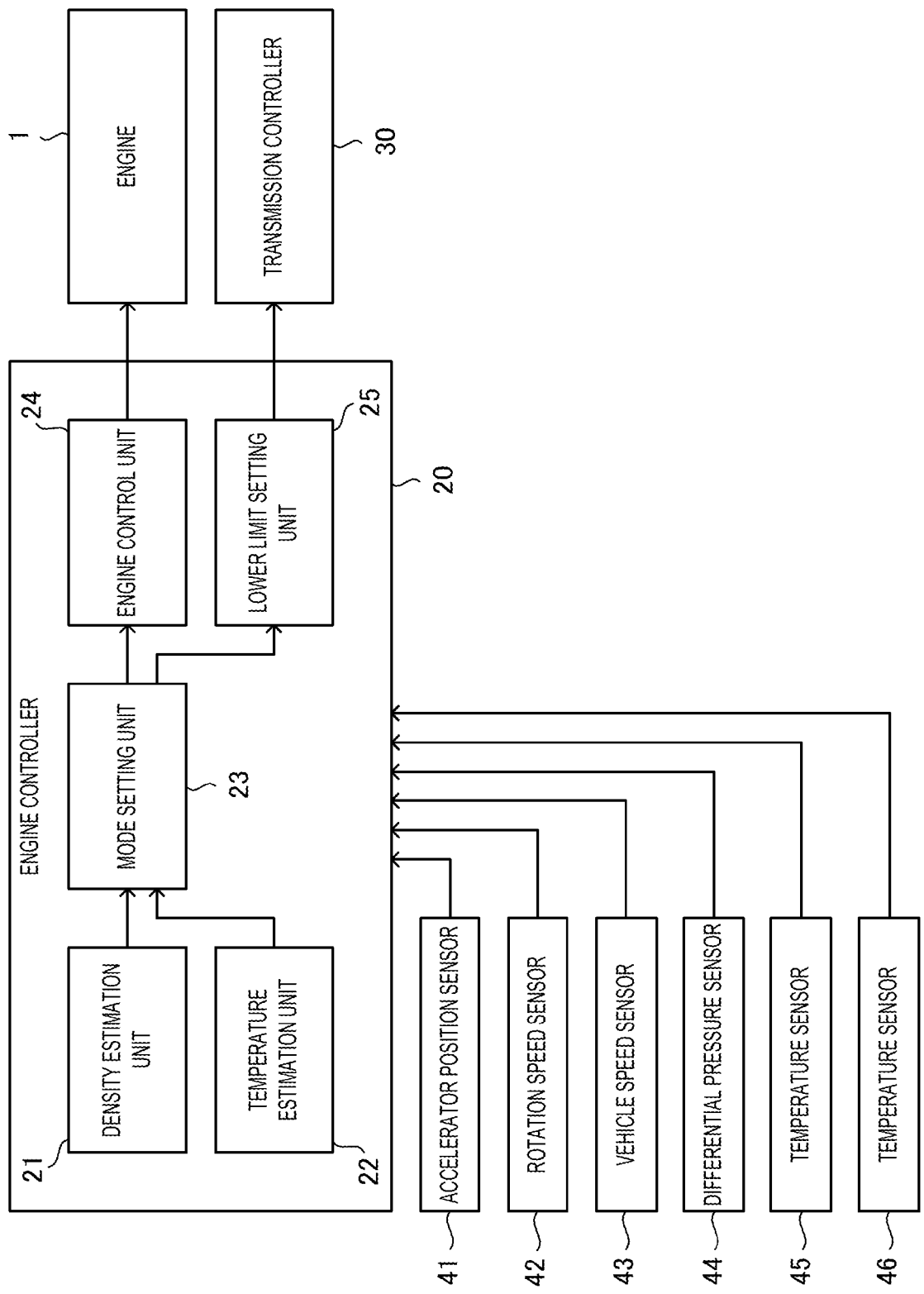
FIG. 5 is a functional block diagram illustrating an engine controller.

Next, the engine controller 20 will be described with reference to FIG. 5. FIG. 5 is a functional block diagram illustrating the engine controller 20.

As shown in FIG. 5, the engine controller 20 includes a density estimation unit 21 that estimates the PM deposition density, a temperature estimation unit 22 that estimates the GPF temperature, a mode setting unit 23 that sets the operation mode of the engine 1, an engine control unit 24 that controls an ignition timing of a spark plug, a fuel injection amount from the injector, and the like, and a lower limit setting unit 25 that sets the lower limit of the engine revolution speed (including the first lower limit and the second lower limit).

In FIG. 5, each function of the engine controller 20 is illustrated as a virtual unit, which does not mean a physical existence. Alternatively, the microcomputer corresponding to each function may also exist physically. For example, the engine controller 20 may include a first microcomputer having the functions of the density estimation unit 21, the temperature estimation unit 22, and the mode setting unit 23, a second microcomputer having the function of the engine control unit 24, and a third microcomputer having the function of the lower limit setting unit 25.

The engine controller 20 receives signals input from the accelerator position sensor 41, the rotation speed sensor 42, the vehicle speed sensor 43, the differential sensor 44, the temperature sensor 45, the temperature sensor 46, and the like.

The density estimation unit 21 estimates the PM deposition density on the basis of, for example, the differential pressure Pd detected by the differential sensor 44. Without limiting thereto, the estimation of PM deposition density may be performed by various methods known in the art.

The temperature estimation unit 22 estimates the GPF temperature on the basis of, for example, the exhaust temperature Ti detected by the temperature sensor 45 and the exhaust temperature To detected by the temperature sensor 46. Without limiting thereto, the GPF temperature may be estimated by various methods known in the art.

The mode setting unit 23 sets the operation mode of the engine 1 by executing the mode setting process.

Figure 6:
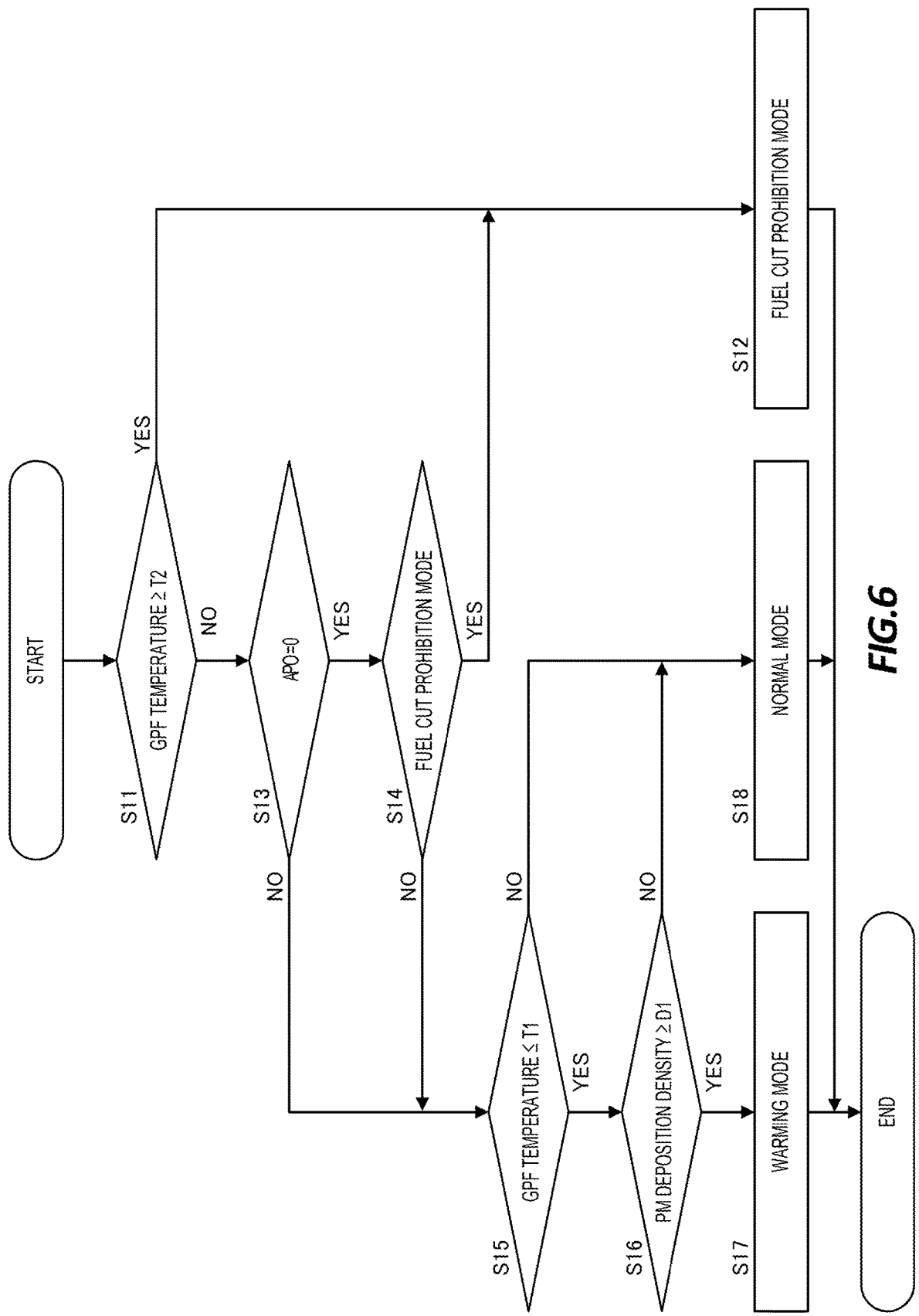
FIG. 6 is a flowchart illustrating a mode setting process.

The mode setting process will now be described with reference to FIG. 6. FIG. 6 is a flowchart illustrating the mode setting process in details. The mode setting process is executed at regular intervals.

In step S11, the mode setting unit 23 determines whether or not the GPF temperature estimated by the temperature estimation unit 22 is equal to or higher than the second temperature T2. The second temperature T2 used in the determination of step S11 is set depending on the PM deposition density estimated by the density estimation unit 21.

If the mode setting unit 23 determines that the GPF temperature is equal to or higher than the second temperature T2, the process advances to step S12. Otherwise, if the mode setting unit 23 determines that the GPF temperature is lower than the second temperature T2, the process advances to step S13.

In step S12, the mode setting unit 23 sets the operation mode of the engine 1 to the fuel cut prohibition mode.

In step S13, the mode setting unit 23 determines whether or not the accelerator is off (APO=0).

If the mode setting unit 23 determines that the accelerator is off, the process advances to step S14. Otherwise, if the mode setting unit 23 determines that the accelerator is on, the process advances to step S15.

In step S14, the mode setting unit 23 determines whether or not the current operation mode of the engine 1 is the fuel cut prohibition mode.

If the mode setting unit 23 determines that the current operation mode of the engine 1 is the fuel cut prohibition mode, the process advances to step S12. Otherwise, if the mode setting unit 23 determines that the current operation mode of the engine 1 is not the fuel cut prohibition mode, the process advances to step S15.

Even when the GPF temperature falls below the second temperature T2 while the fuel cut is prohibited in the accelerator off state, a driver may feel uncomfortable due to a vehicle behavior different from that of the accelerator operation if the fuel cut is executed immediately.

Therefore, according to the present embodiment, even when the GPF temperature falls below the second temperature T2 (step S11: YES) while the fuel cut is prohibited (step S13: YES) in the accelerator off state (step S12: YES), the fuel cut is prohibited continuously (step S12).

Note that steps S13 and S14 may not be processed. If steps S13 and S14 are not processed, and the mode setting unit 23 determines in step S11 that the GPF temperature is lower than the second temperature T2, the process advances to step S15.

In step S15, the mode setting unit 23 determines whether or not the GPF temperature estimated by the temperature estimation unit 22 is equal to or lower than the first temperature T1.

If the mode setting unit 23 determines that the GPF temperature is equal to or lower than the first temperature T1, the process advances to step S16. Otherwise, if the mode setting unit 23 determines that the GPF temperature is higher than the first temperature T1, the process advances to step S18.

In step S16, the mode setting unit 23 determines whether or not the PM deposition density estimated by the density estimation unit 21 is equal to or higher than the density D1.

If the mode setting unit 23 determines that the PM deposition density is equal to or higher than the density D1, the process advances to step S17. Otherwise, if the mode setting unit 23 determines that the PM deposition density is lower than the density D1, the process advances to step S18.

In step S17, the mode setting unit 23 sets the operation mode of the engine 1 to the warming mode.

In step S18, the mode setting unit 23 sets the operation mode of the engine 1 to the normal mode.

As described above, the mode setting unit 23 executes the mode setting process and sets the operation mode of the engine 1 to any of the normal mode, the warming mode, and the fuel cut prohibition mode.

The engine control unit 24 controls the ignition timing of the spark plug, the fuel injection amount from the injector, and the like on the basis of the operation mode of the engine 1 set by the mode setting unit 23.

The lower limit setting unit 25 executes the lower limit setting process to set the lower limit (including the first lower limit and the second lower limit) of the engine revolution speed.

Figure 7:
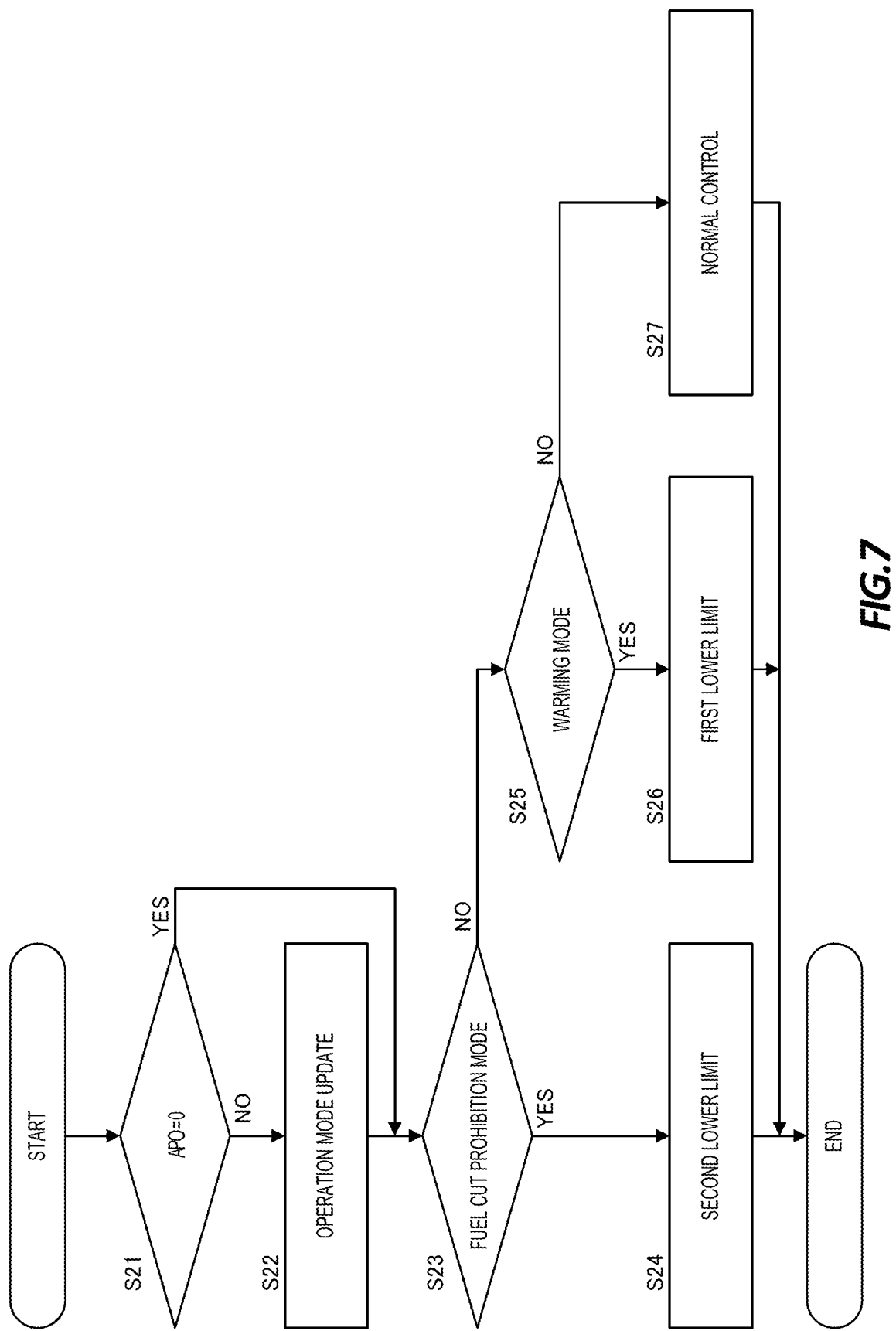
FIG. 7 is a flowchart illustrating a lower limit setting process.

The lower limit setting process will now be described with reference to FIG. 7. FIG. 7 is a flowchart illustrating the lower limit setting process in details. The lower limit setting process is executed at regular intervals.

In step S21, the lower limit setting unit 25 determines whether or not the accelerator is off (APO=0).

If the lower limit setting unit 25 determines that the accelerator is off, the process advances to step S23. Otherwise, if the lower limit setting unit 25 determines that the accelerator is on, the process advances to step S22.

In step S22, the lower limit setting unit 25 updates the operation mode of the engine 1 stored in the RAM. Specifically, the lower limit setting unit 25 reads the operation mode set in the mode setting unit 23 and stores it in the RAM.

In step S23, the lower limit setting unit 25 determines whether or not the operation mode stored in the RAM is the fuel cut prohibition mode.

If the lower limit setting unit 25 determines that the operation mode stored in the RAM is the fuel cut prohibition mode, the process advances to step S24. Otherwise, if the lower limit setting unit 25 determines that the operation mode stored in the RAM is not the fuel cut prohibition mode, the process advances to step S25.

In step S24, the lower limit setting unit 25 sets the second lower limit as the lower limit of the engine revolution speed.

In step S25, the lower limit setting unit 25 determines whether or not the operation mode stored in the RAM is the warming mode.

If the lower limit setting unit 25 determines that the operation mode stored in the RAM is the warming mode, the process advances to step S26. Otherwise, if the lower limit setting unit 25 determines that the operation mode stored in the RAM is not the warming mode, the process advances to step S27.

In step S26, the lower limit setting unit 25 sets the first lower limit as the lower limit of the engine revolution speed.

In step S27, the lower limit setting unit 25 sets a normal control. Under the normal control, the engine revolution speed is not limited. When the lower limit of the engine revolution speed has already been set, the lower limit setting is canceled by the process of step S27.

As described above, the lower limit setting unit 25 sets the lower limit of the engine revolution speed by executing the lower limit setting process.

When the first lower limit is set in the lower limit setting unit 25, the transmission controller 30 controls the shift of the variator 8 such that the target rotation speed TNpri of the primary pulley 8a does not fall below the first lower limit line of FIG. 4.

When the second lower limit is set in the lower limit setting unit 25, the transmission controller 30 controls the shift of the variator 8 such that the target rotation speed TNpri of the primary pulley 8a does not fall below the second lower limit line of FIG. 4.

Figure 4:
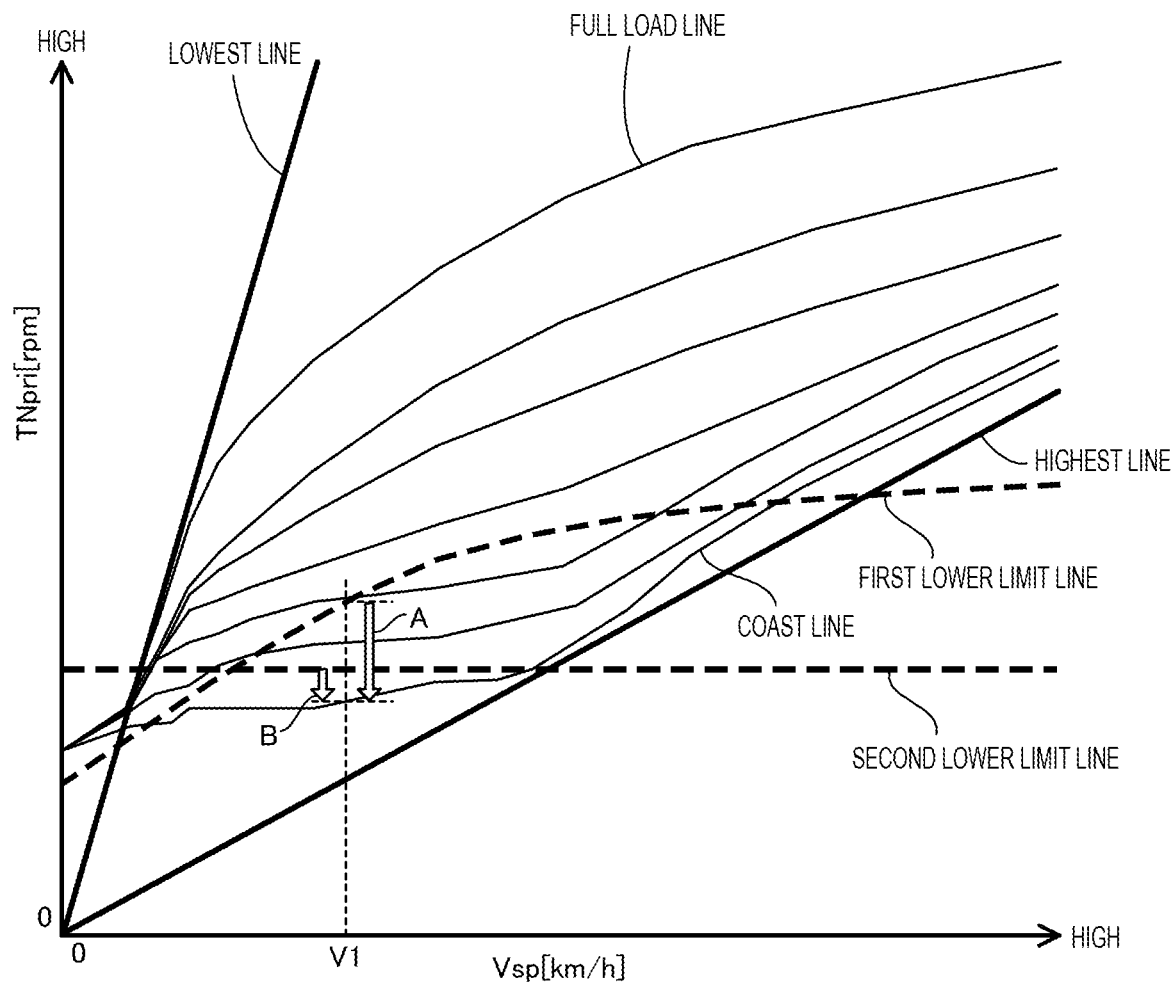
FIG. 4 is a shift map of an automatic transmission.

When the normal control is set by the lower limit setting unit 25, the transmission controller 30 performs the shift control of the variator 8 on the basis of the shift map of FIG. 4.

Here, as described above, in the lower limit setting process, when the accelerator is off (APO=0), the operation mode update process (step S22) is not performed. Therefore, the lower limit setting of the engine revolution speed set for the accelerator off state continues until the accelerator becomes on.

For example, even when the GPF temperature increases over the first temperature T1 from the first temperature T1 or lower in the accelerator off state, and the operation mode set by the mode setting unit 23 changes from the warming mode to the normal mode, the first lower limit setting continues in the lower limit setting process.

In addition, even when the GPF temperature falls below the second temperature T2 from the second temperature T2 or higher in the accelerator off state, and the operation mode set in the mode setting unit 23 changes from the fuel cut prohibition mode to the normal mode, the second lower limit setting continues in the lower limit setting process.

Considering a case where the first lower limit setting is canceled in the accelerator off state with reference to FIG. 4, for example, in the vehicle speed V1, as indicated by the arrow A, the target rotation speed TNpri is changed to the rotation speed determined by the coast line from the rotation speed determined by the first lower limit line. Therefore, the engine revolution speed may change abruptly, which may affect the operability of the vehicle 100.

When the second lower limit setting is canceled in the accelerator off state, the target rotation speed TNpri is changed from the rotation speed determined by the second lower limit line to the rotation speed determined by the coast line as indicated by the arrow B. Therefore, the engine revolution speed may change abruptly, which may affect the operability of the vehicle 100.

In comparison, according to the present embodiment, the lower limit setting set in the accelerator off state continues until the accelerator becomes on. Then, when the accelerator becomes on, the setting is changed depending on the operation mode of the engine 1 at that time.

As a result, as the accelerator becomes on, the target rotation speed TNpri subsequent to cancellation of the lower limit setting becomes a rotation speed higher than that determined by the coast line. Therefore, as compared with the case where the lower limit setting is canceled in the accelerator off state, an abrupt change of the engine revolution speed is suppressed, and it is possible to reduce influence on the operability of the vehicle 100 caused by the cancellation of the lower limit setting. In addition, since the accelerator is on, it can be said that the driver expects a change in mobility of the vehicle 100. Therefore, even when the engine revolution speed changes abruptly, it is unlikely that the driver feels uncomfortable as long as it is not significant.

Note that, if the lower limit setting in the accelerator off state is canceled, for example, the shift control of the variator 8 is performed such that the engine revolution speed slowly changes after the cancellation of the lower limit setting. Therefore, it is possible to reduce influence on the operability of the vehicle 100.

As described above, according to the present embodiment, when the accelerator is off, and the GPF temperature is equal to or lower than the first temperature T1 or equal to or higher than the second temperature T2 higher than the first temperature T1, the engine controller 20 of the vehicle 100 provided with the GPF 12 that collects the PM contained in the exhaust gas from the engine 1 sets the lower limit (including the first lower limit and the second lower limit) for the engine revolution speed. When the lower limit of the engine revolution speed is set, and then, the GPF temperature increases over the first temperature T1 from the first temperature T1 or lower or decreases below the second temperature T2 from the second temperature T2 or higher, the lower limit setting of the engine revolution speed continues until the accelerator becomes on.

As a result, it is possible to reduce influence on the operability of the vehicle 100 caused by cancellation of the lower limit setting while the lower limit for the engine revolution speed is set on the basis of the GPF temperature.

When the accelerator is off, the engine controller 20 executes the fuel cut of the engine 1. If the GPF temperature is equal to or higher than the second temperature T2, the fuel cut is prohibited even when the accelerator is off.

As a result, since combustion of the PM is suppressed, it is possible to suppress thermal deterioration of the GPF 12.

The engine controller 20 continues to prohibit the fuel cut even when the GPF temperature falls below the second temperature T2 while the fuel cut is prohibited in the accelerator off state.

As a result, it is possible to prevent the driver from feeling uncomfortable due to a vehicle behavior different from that of the accelerator operation.

The engine controller 20 sets the first lower limit for the engine revolution speed and executes ignition retardation of the engine 1 when the density of PM in the GPF 12 is equal to or higher than the density D1, and the GPF temperature is equal to or lower than the first temperature T1.

As a result, since the exhaust temperature of the engine 1 increases, it is possible to actively increase the GPF temperature to the PM combustion temperature or higher. Therefore, it is possible to effectively perform the regeneration process of the GPF 12.

Although embodiments of the present invention have been described hereinbefore, the aforementioned embodiments are merely one of the application examples of the present invention, and are not intended to limit the technical scope to the specific configuration of the embodiments described above.

For example, in the embodiment described above, as shown in FIG. 3, the first temperature T1 and the second temperature T2 are set such that the region B and the region C do not overlap with each other. However, as indicated by the two-dotted chain line, the first temperature T1 may be set such that the region B and the region C overlap with each other.

In this case, when the state of the GPF 12 is in the overlapping region between the region B and the region C, it is conceivable to determine in advance which of the warming mode and the fuel cut prohibition mode should be set as the operation mode of the engine 1. From the viewpoint of protecting the GPF 12, it is preferable to set the fuel cut prohibition mode with higher priority.

In addition, for example, the mode setting unit 23 may determine whether or not the state of the GPF 12 is in the overlapping region between the region B and the region C, and the operation mode of the engine 1 may be selected and set such that any higher one of the first lower limit and the second lower limit of the engine revolution speed is set depending on the vehicle speed Vsp.

In addition, according to the embodiment described above, the lower limit setting of the engine revolution speed set in the accelerator off state continues until the accelerator becomes on. However, if a predetermined condition that is considered to have a smaller effect on the operability of the vehicle 100 is satisfied, the lower limit setting may be canceled when the operation mode of the engine 1 becomes the normal mode even in the accelerator off state. As the predetermined condition, for example, a condition that the differential rotation of the target rotation speed TNpri before and after cancellation of the lower limit setting is equal to or lower than a predetermined value may be employed.

In addition, according to the embodiment described above, the engine controller 20 and the transmission controller 30 are individually provided. However, instead of providing the engine controller 20 and the transmission controller 30 individually, an integrated controller having both functions may be provided. Furthermore, the function of the engine controller 20 may be distributed to the transmission controller 30 or another controller (not shown). This similarly applies to the transmission controller 30.

The invention claimed is:

1. A vehicle control method for a vehicle provided with a gasoline particulate filter that collects particulate matter contained in an exhaust gas from an engine, the vehicle control method comprising:
    operating the engine with a lower limit set on an engine revolution speed when an accelerator is set to an off state by a driver while a temperature of the gasoline particulate filter is equal to or lower than a predetermined first temperature;
    operating the engine with the lower limit set on the engine revolution speed when the accelerator is set to the off state by the driver while the temperature of the gasoline particulate filter is equal to or higher than a predetermined second temperature, the predetermined second temperature being higher than the predetermined first temperature; and
    after the lower limit for the engine revolution speed is set, while the accelerator is set to the off state by the driver, continuing to operate the engine with the lower limit set on the engine revolution speed when the temperature of the gasoline particulate filter increases from a temperature at or below the predetermined first temperature to a temperature above the predetermined first temperature or decreases from a temperature at or above the predetermined second temperature to a temperature below the predetermined second temperature, until the accelerator is set to an on state by the driver.

2. The vehicle control method according to claim 1, wherein
    a fuel cut of the engine is executed when the accelerator is off, and
    the fuel cut is prohibited even in the accelerator off state when the temperature of the gasoline particulate filter is equal to or higher than the predetermined second temperature.

3. The vehicle control method according to claim 2, wherein
    a prohibition of the fuel cut continues even when the temperature of the gasoline particulate filter is lower than the predetermined second temperature during the prohibition of the fuel cut in the accelerator off state.

4. The vehicle control method according to claim 1, wherein
    the lower limit is set for the engine revolution speed, and ignition retardation of the engine is executed when a density of the particulate matter in the gasoline particulate filter is equal to or higher than a predetermined density while the temperature of the gasoline particulate filter is equal to or lower than the predetermined first temperature.

5. A vehicle control device for a vehicle provided with a gasoline particulate filter that collects particulate matter contained in an exhaust gas from an engine, the vehicle control device comprising:
    a controller and a non-transitory computer readable medium including instructions that, when executed, cause the controller to perform:
    operating the engine with a lower limit set on an engine revolution speed when an accelerator is set to an off state by a driver while a temperature of the gasoline particulate filter is equal to or lower than a predetermined first temperature;
    operating the engine with the lower limit set on the engine revolution speed when the accelerator is set to the off state by the driver while the temperature of the gasoline particulate filter is equal to or higher than a predetermined second temperature, the predetermined second temperature being higher than the predetermined first temperature; and after the lower limit for the engine revolution speed is set, while the accelerator is set to the off state by the driver, continuing to operate the engine with the lower limit set on the engine revolution speed when the temperature of the gasoline particulate filter increases from a temperature at or below the predetermined first temperature to a temperature above the predetermined first temperature or decreases from a temperature at or above the predetermined second temperature to a temperature below the predetermined second temperature, until the accelerator is set to an on state by the driver.

* * * * *